United States Patent [19]
Dobrinska et al.

[11] 3,990,541
[45] Nov. 9, 1976

[54] PARK-LOCK MECHANISM FOR TRANSMISSION

[75] Inventors: Robert F. Dobrinska, St. Francis; John L. Tomolinson, Oak Creek, both of Wis.

[73] Assignee: J. I. Case Company, Racine, Wis.

[22] Filed: July 21, 1975

[21] Appl. No.: 597,420

[52] U.S. Cl. .................................. 188/31; 188/69; 192/4 A
[51] Int. Cl.² ........................................ B60T 1/06
[58] Field of Search ............... 188/31, 60, 69, 82.7; 192/4 A, 71; 74/1.5, 577 M

[56] References Cited
UNITED STATES PATENTS

| | | | |
|---|---|---|---|
| 1,023,731 | 4/1912 | Georgeff | 188/69 X |
| 2,865,227 | 12/1958 | Kelley et al. | 192/4 A X |
| 2,875,856 | 3/1959 | Mrlik et al. | 188/69 |
| 3,074,513 | 1/1963 | Robinson | 188/69 |
| 3,116,815 | 1/1964 | Chapman | 192/4 A X |
| 3,300,001 | 1/1967 | Stockton | 192/4 A |
| 3,856,119 | 12/1974 | Harrington | 188/82.7 X |

FOREIGN PATENTS OR APPLICATIONS

| | | | |
|---|---|---|---|
| 648,394 | 9/1962 | Canada | 188/82.7 |
| 1,060,182 | 3/1954 | France | 188/69 |

*Primary Examiner*—Trygve M. Blix
*Assistant Examiner*—Edward R. Kazenske
*Attorney, Agent, or Firm*—Arthur J. Hansmann

[57] ABSTRACT

A park-lock mechanism for a transmission having a rotatable gear and a double lug latch pivotally mounted adjacent the gear and having its lugs spaced apart a distance different from that of the spacing of the teeth on the gear, whereby one of the lugs will always align with the gear teeth spacing for securing the gear against rotation. The latch is also supported on a lever which is under the influence of a control mechanism including a cam and a spring and a control rod.

1 Claim, 2 Drawing Figures

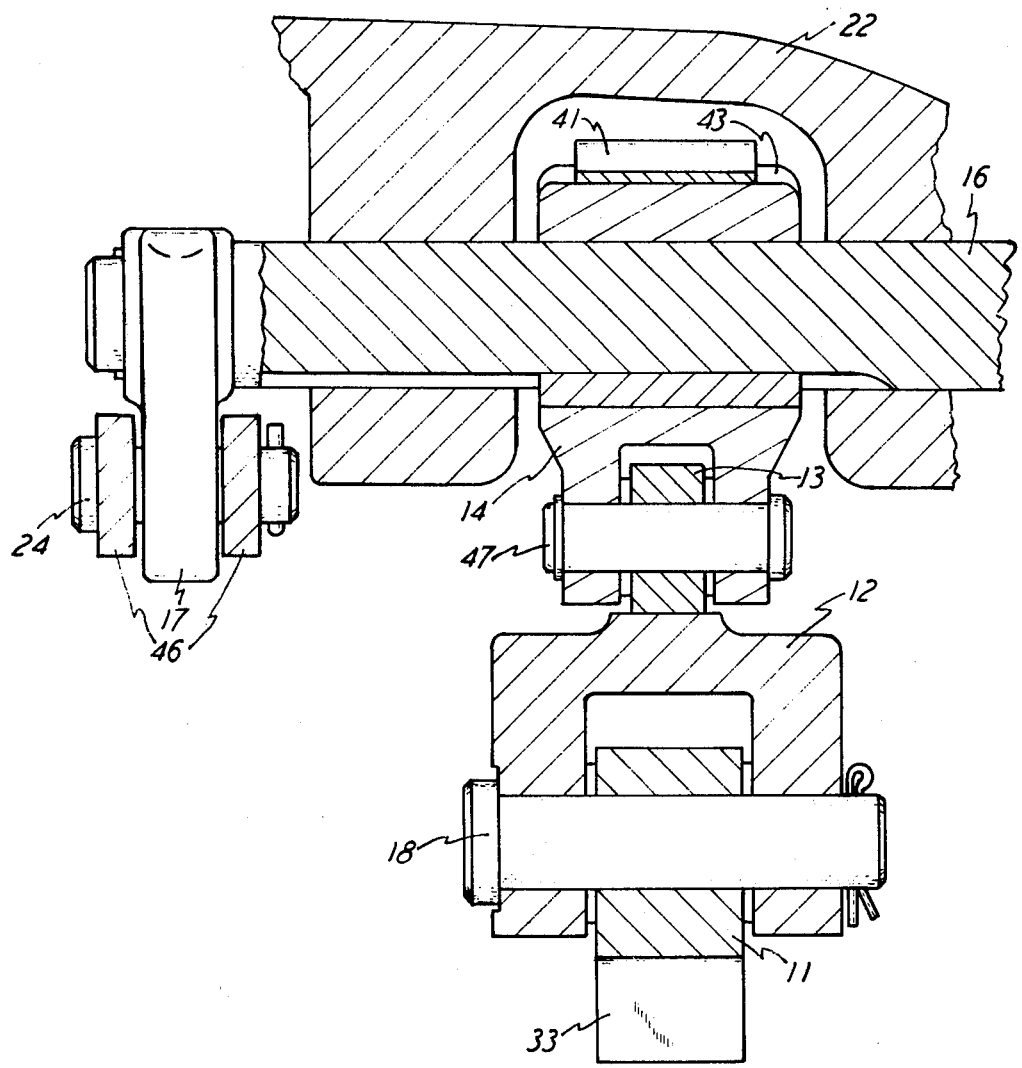

PARK-LOCK MECHANISM FOR TRANSMISSION

This invention relates to a park-lock mechanism for a transmission, and, more particularly, it relates to a latch engagable with a gear in a vehicle transmission for securing the gear in a non-rotatable position when the vehicle is parked.

BACKGROUND OF THE INVENTION

The prior art is already aware of park-lock devices for use with vehicle transmissions, and these prior devices include mechanisms in the nature of latches and pawls or the like which engage the teeth of transmission gears for securing the gears in a non-rotatable position. One example of a prior art mechanism is disclosed in U.S. Pat. No. 2,875,856 which also shows a cam-type of arrangement for advancing the latch toward the gear and a spring for retracting the latch from the gear.

In these prior art devices, the latch has a lug or tooth which can be manually positioned toward the gear to be restrained, and the latch lug or tooth might or might not enter the spacing between the gear teeth to arrive at the secured position. That is, the latch lug might move directly on to the gear tooth itself, rather than into the spacing between two teeth, and, as such, the latch would not hold the gear against rotation until the latch lug would enter the spacing between the gear teeth. That prior art arrangement therefore is inefficient and not completely reliable in holding the gear against any and all rotation. Therefore, where the prior art latch does not firmly engage the gear by entering the spacing between the teeth, any movement of the gear itself can cause damage to the latch or the gear teeth when the latch does enter the spacing in response to that movement.

In contrast to the prior art, the present invention provides a park-lock mechanism for a transmission wherein the latch includes two lugs which are spaced apart at a dimension different from the spacing of the teeth of the gear which the latch secures against rotation. With this arrangement, the mechanism of this invention assures that the latch will always and immediately be set in the latching and secure position when desired, and the gear need not be rotated to a certain position to achieve the latching described. Accordingly, an improved and more reliable and secure type of mechanism is provided in this invention. Further, the mechanism of this invention is sufficiently sturdy and can be easily manipulated for positioning the latch in the secured position and in the released position, and the mechanism also includes an arrangement for retaining the parts in the secured position and also in the released position for optimum safety and reliability in the operation of the mechanism.

Other objects and advantages will become apparent upon reading the following description in light of the accompanying drawings.

BRIEF DESCRIPTION OF THE DRAWINGS

FIG. 2 is a sectional view taken substantially along the jagged plane designated by the line 2—2 of FIG. 1.

DETAILED DESCRIPTION OF THE PREFERRED EMBODIMENT

Figure 1:
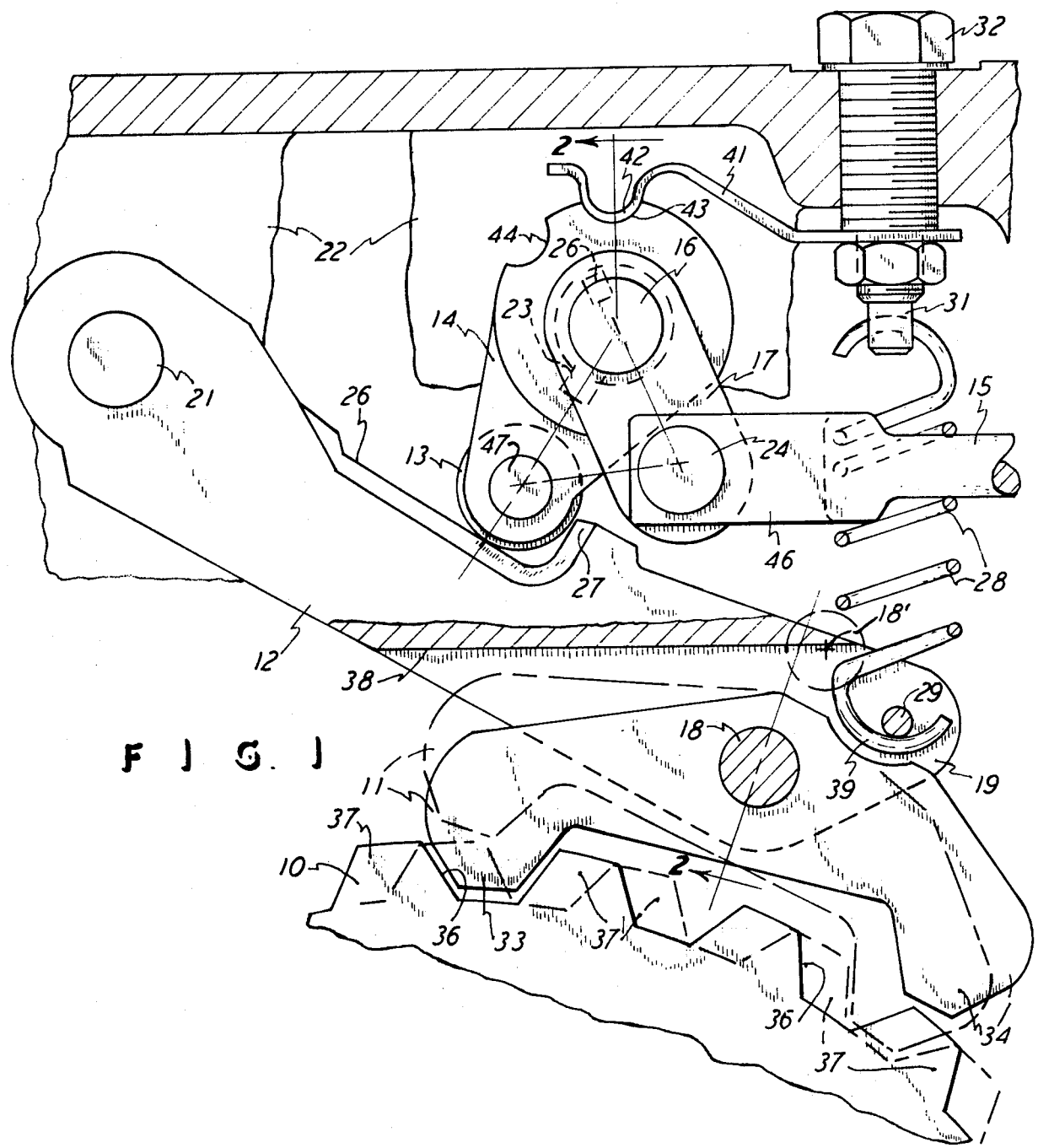
FIG. 1 is a side elevational view of an embodiment of the mechanism of this invention, with parts thereof broken away.

The drawings show the park-lock mechanism of this invention applied to a rotatably mounted gear 10 which is a gear of a vehicle transmission. The objective of the invention is to secure the gear 10 in a non-rotatable position, such as when the vehicle, wherein the gear 10 is located, is to be retained in a park position. As such, the entire environment is somewhat similar to that shown in U.S. Pat. No. 2,875,856 which discloses a latch engagable with a gear in a vehicle transmission. Further, in the present invention, the mechanism of this invention is controlled by a rod 15 which is fragmentarily shown in FIG. 1 and which would extend to a position convenient for manipulation by the operator, and, as such, U.S. Pat. Nos. 3,550,715, and 3,522,744 generally show control levers and rods for controlling the gears of a vehicle, such as a tractor.

Still considering the generalities, the drawings show a pivotally mounted latch 11 supported on a lever 12 which in turn is controlled by a roller 13 on an arm 14 supported on a shaft 16 which is under the influence of the rod 15 by means of the interconnecting link 17.

More specifically, the latch 11 is supported on the lever 12 by means of a pivot pin 18 extending therebetween, and the latch may therefore pivot between the solid line position and the dot-dash position shown thereof. Also, the lever 12 is bifurcated to have its spaced apart portions 19 flank the latch 11 to thereby position and guide the latch 11 relative to the gear 10. The lever 12 is pivotally mounted on a pin 21 supported on the transmission casing 22 which may be of any generally conventional arrangement and which is of course the conventional transmission casing for the vehicle, such as a tractor. Therefore, the lever 12 can pivot up and down on its support pin 21 to thereby move the latch 11 radially toward and radially away from the gear 10, and the movement is such that the pin 18 would move to the dotted position designated 18' when the latch 11 is moved away from the gear 10 to the released position of the mechanism.

The shaft 16 is suitably rotatably mounted in the casing 22 and it supports the member 14 which is secured to the shaft 16 by means of the key 23 so that the member 14 rotates with the shaft 16 which in turn is induced to rotate by means of the actuation of the rod 15 which is connected to the link 17 through the pin 24 and the link 17 is secured to the shaft 16 by means of the key 26. Therefore, movement of the rod 15 will induce rotation of the shaft 16 and thereby induce corresponding rotation of the member 14 and thus displace the roller 13 which is in contact with the surface 26 of the lever 12. In that manner, the lever 12 is caused to pivot toward the gear 10 and thereby move the latch 11 into the secured or locked position. Also, the lever 12 has a projection designated 27 which is disposed in the path of the roller 13 and which thereby serves as a stop for the roller 13 and thus precludes the possibility of having the roller 13 move beyond the position shown in FIG. 1 when the shaft 16 is being rotated counter-clockwise. Still further, it will be noticed that the lever surface 26 is extending along a plane which is at right angles to the longitudinal axis of the shaft 16 when the roller 13 is in the end limit position shown in FIG. 1, that is when the roller 13 is against the stop 27, and thus the member 14 is in its most secure position when the latch 11 is in its locking position. Therefore, upward pressure on the lever 12, if there be such from the gear 10 would not create any tendency for rotation of the member 14 about the shaft 16 to thereby move the lock out of the secured position shown.

When the rod 15 is maneuvered to have the shaft 16 rotate clockwise from the position shown in FIG. 1, then the roller 13 will move upwardly on the surface 26 and permit the lever 12 to pivot counter-clockwise about its support pin 21, all to thereby release the latch 11 from the gear 10 under the influence of a tension spring 28 which is connected with a pin 29 on the lever 12 and a bolt end 31 of a supporting bolt 32 extending through the transmission casing 22, as shown. Therefore, the spring 28 serves as a return spring for releasing the latch 11 from the gear 10, and the release is reliable and always accomplished because of the arrangement of the latch 11 with regard to its configuration, as described hereinafter, and with regard to the location of the pivot pin 18 intermediate the end lengths of the latch 11. That is, the latch 11 has two spaced apart lugs 33 and 34 which are of a trapezoidal shape, as seen in FIG. 1, and they project on the latch 11 and radially toward the gear 10 and are of a size no greater than the spacings 36 between the teeth 37 of the gear 10. Therefore, with the size relationship of the lugs 33 and 34 compared to the gear spacings 36, and with the relative profiles or configurations, as seen in FIG. 1, the lugs 33 and 34 will readily and easily enter the spacings 36 and will also be removable from the spacings 36, without any binding or hesitation in the action. Of particular importance is the fact that the dimension or spacing between the lugs 33 and 34 is different from the overall span of the spacing of a comparable number of gear teeth 37. That is, the lugs 33 and 34 are spaced apart at a dimension of a factor of one-half of the gear teeth spacing 36, and that factor is such that only one lug 33 or 34, at any one time, can enter one spacing 36, but both lugs 33 and 34 will never be simultaneously in a spacing 36. With that arrangement, the gear 10 need not be slightly rotated beyond an already stopped or set position in order to assure that one of the lugs 33 or 34 will enter a spacing 36 to lock the gear 10 in the park or locked position. Accordingly, the solid line position for the latch 11 shows the lug 33 in one spacing 36, and it shows the lug 34 clear or the gear 10. However, if the gear 10 had stopped in a position comparable to that shown by the dot-dash lines which represent the profile of the gear 10, then the lug 33 would not have entered the spacing 36 but instead the lug 34 would have entered a spacing 36, and that is shown by the dot-dash line of the latch 11. In that manner, the latch 11 is always available for immediately locking or latching with the gear 10, and the gear need not be rotated to a position to have one of its spacings 36 receive one of the lugs 33 or 34, since one of the lugs 33 or 34 will always be available for entering a spacing 36, regardless of the rotated position of the gear 10.

Also, the lever 12 has a wall or surface 38 which extends adjacent the latch 11 and serves as a stop or abutment so that the latch 11 cannot completely tip or pivot about its pin 18 and out of a ready position with the lugs 33 and 34 faced toward the gear 10, as shown in FIG. 1. Further, the end 39 of the spring 28 or the pin 29 itself will serve as another stop for the latch 11 to preclude pivot in the counter-clockwise direction about the pin 18. A flat spring or clip 41 is mounted on the bolt 32 and has an arcuate portion 42 which extends to the member 14 for engaging a semi-circular or arcuate opening 43 in the surface of the member 14 when the member 14 is in the secured position shown in FIG. 1. Therefore, the clip or spring 41 holds the mechanism in that secured position. Further, the arcuate arrangement of the clip end 42 and the opening 43 are such that the downward pressure of the clip 41 on the member 14 could even cause a slight rotation of the member 14 and its shaft 16 and the displacement of the roller 13 and consequent pivot of the lever 12 to assure locking position for the latch 11 in the event that the rod 15 were not set in the fully latched position or if there were any tolerance in the connecting parts in the mechanism. Also, the member 14 has a second arcuate notch or opening designated 44, comparable to the opening 43, and that is positioned on the member 14 to hold the member 14 in the released or unlatched position with the roller 13 moved away from the lever stop 27 to thereby permit the lever 12 to pivot upwardly under the influence of the spring 28 and to the unlatched position described herein. FIG. 2 shows that the rod 15 is also bifurcated in its ends designated 46 which flank the link 17 and thereby provide desired control of the pivoting of the link 17 and consequent rotation of the shaft 16, and, FIG. 2 is the section taken along the jagged line shown extending to the longitudinal axis of the pin 24 in FIG. 1, and this is for the purpose of clarity in showing the construction and arrangement between the rod ends 46 and the link 17, in addition to showing the section through the member 14 and the roller 13 which is rotatably supported on the pin 47 extending between those two parts as also seen in FIG. 2.

Accordingly, the parts shown and described and which influence the position of the latch 11 are the control mechanism operatively associated with the latch 11 for moving the lugs 33 and 34 into and out of engagement with the gear teeth 37. Of course the gear ten is of a conventional arrangement with the teeth 37 uniformly spaced apart, by means of the uniform spacings 36, as shown, but the locking arrangement described herein will always assure that the latch 11 will engage the gear 10 in the latched position without requiring any maneuvering or slight rotation of the gear 10 to align a lug 33 or 34 with the gear spacings 36. Likewise, the roller 13 is described as a cam which is part of the control mechanism, along with the spring 28. The member 14 is a detent mechanism which includes its counterpart of the clip 41, as described above. Thus, the detent mechanism controls the position of the cam which is maneuvered along the surface 26 which is therefore the cam follower surface or portion, and that surface 26 is a planar surface disposed at right angles to the shortest line between itself and the shaft 16 for securing the lever 12 in the park-lock position.

What is claimed is:

1. A park-lock mechanism for a transmission, comprising a rotatably-mounted gear having gear teeth uniformly spaced apart thereon, a lever pivotally mounted adjacent said gear, a latch pivotally mounted on said lever and having two lugs projecting thereon toward said gear teeth and extending to a position of engagement with said gear teeth when said lever and said latch are pivoted toward said gear teeth, the dimension of the spacing between said lugs differing from the spacing between said gear teeth by a factor of one-half of the uniform spacing between said gear teeth, to assure that one of said lugs will align with the spacing between two of said gear teeth when the other of said lugs is aligned with still another of said gear teeth rather than with the space adjacent said another gear tooth, a spring connected with said lever for urging said lever and said latch away from said gear and thereby urging said lugs out of engagement with said gear teeth, said lever having a cam follower surface thereon, a rotatably-mounted shaft, a cam affixed to said shaft and having a roller thereon disposed on said cam follower surface to be operatively associated with said lever and arranged to pivot said lever toward said gear, a control rod connected with said shaft and operatively associated with said cam for pivoting said cam, a spring-biased detent mechanism operatively associated with said cam for releasably securing said cam in a pivoted position whereby said cam bears against said lever to pivot said lever toward said gear, a stop on said lever and engagable with said cam roller for stopping said cam when said lever is pivoted toward said gear, and said lever cam follower surface being disposed on a plane at a right angle to the shortest line between said surface and said shaft, for securing said lever pivoted toward said gear in the aforesaid engaged pivot position of said lever and said latch.

* * * * *